March 18, 1952 — C. M. FABER — 2,589,355
CHAIN COUPLING
Filed Oct. 27, 1948
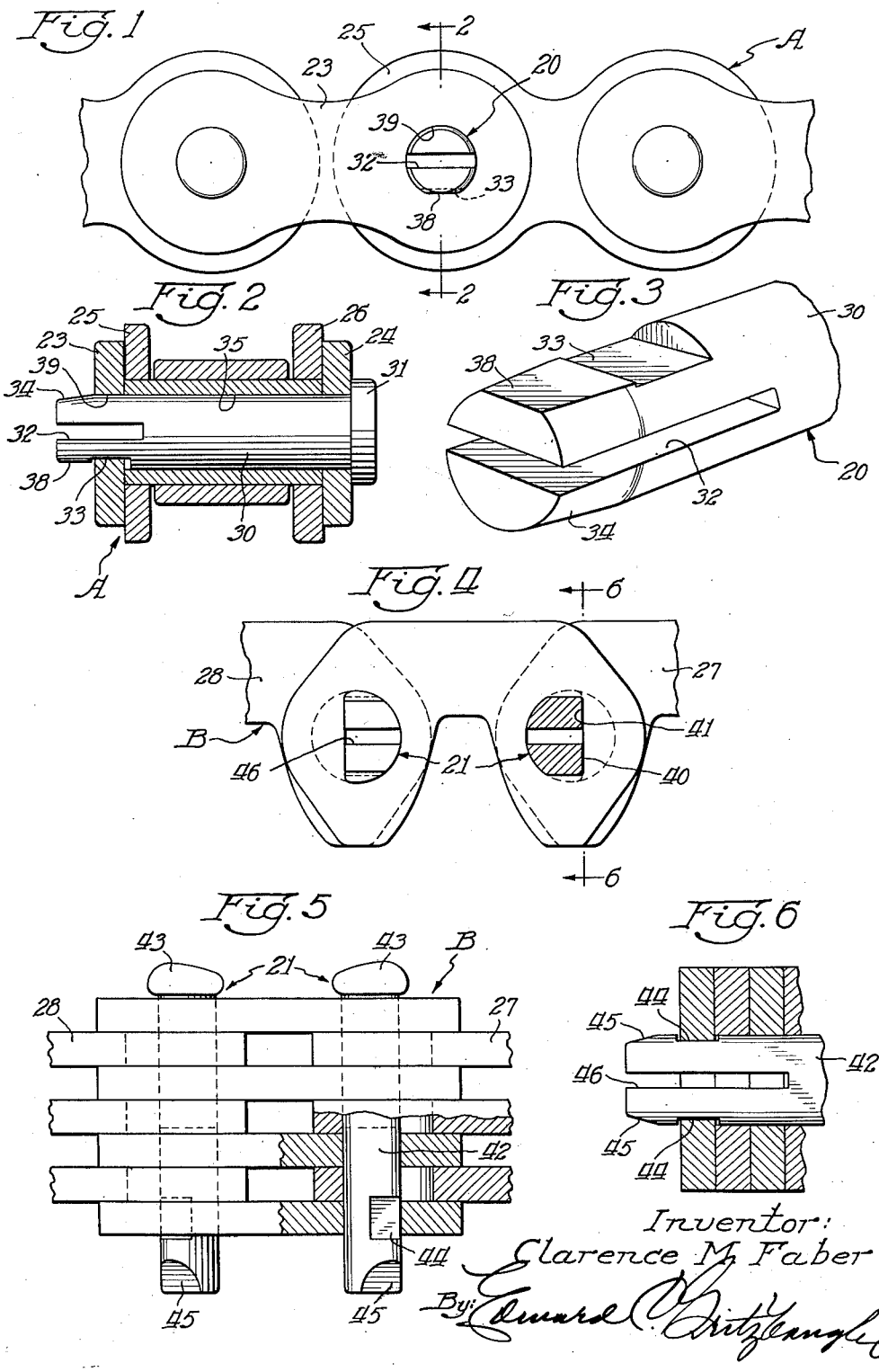
Inventor:
Clarence M. Faber Patented Mar. 18, 1952

2,589,355

UNITED STATES PATENT OFFICE 2,589,355

CHAIN COUPLING

Clarence M. Faber, Ithaca, N. Y., assignor to Morse Chain Company, Ithaca, N. Y., a corporation of New York Application October 27, 1948, Serial No. 56,745

10 Claims. (Cl. 74—254)

This invention relates in general to new and useful improvements in drive chains and is particularly concerned with a chain coupling means including an improved coupling pin which may be conveniently and advantageously employed in conventional roller and silent chains for coupling the loose ends thereof.

Heretofore, in prior art chain structures, coupling problems presented a challenge to the ingenuity of the inventor for a solution whereby the cost due to special handling may be reduced and, more important, the finding of a suitable coupling which may be quickly and conveniently operated to couple the loose ends of a chain and which may further provide for convenient uncoupling if so desired.

Accordingly, a principal object and accomplishment of the invention is to provide a coupling pin for chain drives which may be conveniently inserted between connecting links of a chain, said coupling pin having means whereby the pin is advantageously held in its operative position by merely inserting the pin through the links.

A further object and accomplishment of the invention is to provide a coupling pin for drive chains having means whereby the coupling pin may be not only conveniently assembled but may be equally as conveniently and advantageously disassembled without the necessity of fancy tools.

The invention seeks, as a further object and accomplishment, to provide a coupling pin for drive chains as contemplated herein and characterized by an arrangement of parts to more advantageously and satisfactorily perform the function required of it and adapted to provide a compact unit which will successfully combine the factors of structural simplicity and durability, and yet be economical to manufacture.

Another object and accomplishment of the invention is to improve the construction of coupling parts for drive chains by the incorporation therein of a specific and particular coupling pin as contemplated herein, thereby to increase the efficiency and versatility of such drive chains; and to this end, an important feature of the invention is to provide a coupling pin comprising in general, an elongated body member having a head at one end and the opposite end being provided with a relatively small notch or slit, the end of the body member having the notch being provided with a slot arrangement and the end portions thereof being provided with a chamfered surface, said end portions being adaptable to be inserted into suitable apertures in interlaced chain links so that the notch portions thereof will engage the outside chain link to lock the pin in operative position. The chain being capable of disassembly by merely employing a pliers to squeeze the end portions of the coupling pin thereby the pin will be able to be pulled outwardly of the chain links to separate the chain links.

Additional objects, features and advantages of the invention disclosed herein will be apparent to persons skilled in the art after the construction and operation are understood from the within description.

It is preferred to accomplish the various objects of this invention and to practice the same in substantially the manner hereinafter fully described and as more particularly pointed out in the appended claims, reference being had to the accompanying drawing, which forms a part of this specification, wherein:

Fig. 1 is a side elevational view of a roller drive chain embodying the features of the invention;

Fig. 2 is a sectional view of the chain depicted in Fig. 1 and being taken substantially on the plane of the line 2—2 in Fig. 1;

Fig. 3 is a perspective view of an end portion of the chain coupling pin with which this invention is particularly concerned;

Fig. 4 is a side elevational view of a silent chain embodying the features of this invention;

Fig. 5 is a top elevational view of the silent chain depicted in Fig. 4 with portions thereof shown in section to more clearly illustrate the construction thereof; and Fig. 6 is a fragmentary sectional view of the silent chain depicted in Fig. 4 and being taken substantially on the plane of the line 6—6 in Fig. 4.

The drawing is to be understood to be more or less of a schematic character for the purpose of illustrating and disclosing a typical or preferred form of the improvements contemplated herein.

Referring to the drawing, particularly Fig. 1, I have illustrated the chain coupling pin with which the present invention is particularly concerned and designated in its entirety by the numeral 20, as being adjunctively employed, for example, to a roller chain designated in its entirety by the letter A.

In Fig. 4, I have illustrated the chain coupling pin with which the invention is particularly concerned and designated in its entirety by the numeral 21, as being adjunctively employed, for example, to a conventional silent chain designated in its entirety by the letter B.

In the illustrated embodiment of the invention depicted in Fig. 1 the coupling pin 20 is shown in its normal operative position to couple the outer links 23 and 24 with the inner links 25 and 26 of the chain assembly A.

In the illustrated embodiment of the invention depicted in Fig. 4, the coupling pin 21 is shown in its normal operative position as coupling the chain segments as at 27 with the chain segments as at 28 of the chain B.

Suffice it to say, since the invention is not particularly concerned with the precise construction of the illustrated silent chain and the illustrated roller chain and/or their associated parts, they will not be further described in detail and it is deemed sufficient for all intentions and purposes herein contained to show only portions thereof adjacent to and cooperating with the chain coupling pin contemplated herein. It is to be understood that details of construction of the silent or roller chains and their associated parts may be modified to suit particular conditions and I do not wish to be limited to the construction of these elements as set forth, except where such construction particularly concerns the invention contemplated herein.

Having thus described by way of example, a possible adaptation of the chain coupling pin, and having described the general environment surrounding the adaptation, the specific construction and cooperating functions of the parts of the chain coupling pin with which the present invention is particularly concerned, will now be described in detail.

In the exemplary embodiment of the invention depicted in Fig. 1, the chain coupling pin 20 with which the present invention is particularly concerned comprises in general, an elongated body member 30 having a head 31 at one end and the opposite end being provided with a relatively small notch or slit 32, the end of the body member 30 having the notch 32 being provided with a slot arrangement 33 and the end portions thereof being provided with a chamfered surface 34, said end portions being adaptable to be inserted into the aperture 35 in the interlaced chain links so that the notch portions 33 will engage the outside chain link 23 to lock the pin in operative position.

In general, the coupling pin with which the present invention is particularly concerned is headed on one end as at 31 and the opposite end thereof being split somewhat like a conventional type cotter pin, and having a small notch arrangement as at 33 which snaps into the coupling link. It is notable that the pin 20 is heat treated by conventional methods usually employed in the heat treatment of the regular pins in chains of this class. This treatment affords a desirable spring action to the pin.

In referring to Figs. 1 and 3 it can be seen that the end of the body member 30 is provided with the chamfered surface 34 which extends substantially around the entire body of the pin. A flattened surface 38 is provided to cooperate with the particular shape of the aperture 39 of the chain link 23. It is notable that this construction provides ease and convenience in the insertion of the pin into its operative position to couple the chain links and further provides for convenience in uncoupling procedures by facilitating the removal of the pin from its coupling position in the chain.

The construction of the chain pin 21 is similar to that as described with respect to the chain pin 20; however, in order to adapt the chain pin contemplated herein to silent chain constructions it was necessary to enlarge the flattened surface as at 40 so that the end portions of the pin may be accommodated by the apertures as at 41 in the silent chain links.

A review of Fig. 5 will disclose that the chain pin 21 is provided with a body 42 having a head 43 and the opposite end being provided with a slot 46 and a notch arrangement 44 and a chamfered surface 45 all similarly constructed to that of the chain pin hereinbefore described.

In accordance with the construction of the present invention, in order to couple the chain it is only necessary to bring both ends of the chain together over a sprocket and insert the coupling pin from the side opposite the coupling link 23 and thereafter the pin is pushed through the chain and it will snap in place in the coupler link.

In order to uncouple the chain simply pinch the end of the pin with a pair of conventional pliers, thereby the end of the pin having the chamfer 34 is automatically forced out of the chain.

In some adaptations it may be well to furnish the coupling pins of this invention as a coupling link assembly consisting of two links and two pins or the coupling pins can be supplied attached to the end of the chain with a single coupler pin.

It is notable that the structure contemplated is economical to manufacture and readily adaptable to mass production manufacturing principles, thereby substantially reducing the cost of manufacture and providing convenience in coupling of chains.

From the foregoing disclosure, it can be observed that I have provided a chain coupling pin which efficiently fulfills the objects thereof as hereinbefore set forth and provides numerous advantages which may be summarized as follows:

1. Structurally simple, efficient and durable;
2. Economical to manufacture and readily adaptable to mass production manufacturing principles; and
3. The provision of a chain coupling pin providing convenience in coupling loose ends of chains and providing convenience in uncoupling of the chain without the necessity of fancy tools.

While I have illustrated a preferred embodiment of my invention, many modifications may be made without departing from the spirit of the invention, and I do not wish to be limited to the precise details of construction set forth, but wish to avail myself of all changes within the scope of the appended claims.

I claim:

1. A flexible chain drive comprising, a chain strand composed of interlaced chain links, a chain coupling pin comprising an elongated body having a head at one end and the opposite end being provided with a relatively small slot, the end of the body member having the slot being provided with a notch arrangement and a chamfered surface, the slotted end portions of the body being adaptable to be inserted into apertures in the interlaced chain links so that the notch portions will engage and cooperate with an outside chain link to lock the pin in operative position.

2. A chain coupling pin for a flexible chain drive having a chain strand comprising interlaced chain links, said coupling pin comprising an elongated body having a head at one end, and the opposite end of the coupling being provided with a slot and a notch arrangement, the slotted end of the body being adapted to be inserted into registered through openings in the chain links, and the notch portions of the coupling pin cooperating with portions of the chain links to releasably lock the coupling pin in operative position.

3. In a flexible chain drive having a chain strand comprising interlaced chain links, the combination of a chain coupling pin comprising an elongated body, a head at one end of said body, a relatively small slot at the other end of the body member, and notch portions to engage and cooperate with the outside chain link to lock the pin in operative position.

4. A chain coupling pin for a flexible chain drive composed of interlaced chain links, comprising an elongated body having means at one end thereof for limiting the transverse movement of the pin and the opposite end being provided with means whereby the end portions may be resiliently compressed, the end of the body having the aforementioned compressible means being provided with a notch arrangement and a chamfered surface, the notched end portions of the body being adaptable to be inserted into apertures in the interlaced chain links so that the notch portions will engage and cooperate with a chain link to lock the pin in operative position.

5. A chain coupling pin for a flexible chain drive having a chain strand comprising interlaced chain links, said coupling pin comprising an elongated body having at one end thereof means effecting the resiliency of such end portion, said end portion having a chamfered surface arranged to cooperate with said resiliency effecting means to permit insertion of the body into registered through openings in the chain links, and said end portion being provided with means arranged to cooperate with portions of the chain links to releasably lock the coupling pin in operative position.

6. A chain coupling pin for a flexible chain drive composed of interlaced chain links, comprising in combination, an elongated body, means disposed at one end of said body for limiting the transverse movement of the pin and the opposite end thereof being provided with means whereby the end portions of the pin may be resiliently compressed, a chamfered surface at the compressible end portions of the body, and means forming portions of said body and arranged to engage and cooperate with an outside chain link to releasably lock the pin in operative position.

7. A chain coupling pin for a flexible chain drive composed of interlaced chain links, comprising in combination, an elongated body, one end of said body being provided with means whereby the end may be resiliently compressed, a chamfered surface adjacent the compressible end portions of the body, and notch means arranged to engage and cooperate with a link of said chain to releasably lock the pin in operative position, said elongated body being adaptable to be inserted into apertures in the interlaced chain links, and said body being provided at the end portions thereof opposite to the compressible end portions with means for limiting the transverse movement of the pin with respect to an associated chain link.

8. A chain coupling pin for a flexible chain drive having a chain strand comprising interlaced chain links, said coupling pin comprising a body member having one end thereof provided with compressible means and a notch arrangement, the body member being adapted to be inserted into registered through openings in the chain links, and the notch portions of the coupling pin cooperating with portions of the chain links to releasably lock the coupling pin in operative position.

9. A flexible chain drive comprising, a chain strand composed of interlaced chain links, a coupling pin comprising an elongated body having at one end thereof means effecting the resiliency of such end portion, said end portion having a chamfered surface arranged to cooperate with said resiliency effecting means to permit insertion of the body into registered through openings in the chain links, and said end portion being provided with slot means arranged to engage and cooperate with an outside chain link to releasably lock the coupling pin in operative position.

10. The combination with a flexible chain drive composed of interlaced chain links, of a chain coupling comprising an elongated body, means disposed at one end of said body for limiting the transverse movement of the pin and the opposite end thereof being provided with means whereby the end portions of the pin may be resiliently compressed, and means disposed adjacent said resiliently compressible end portion and arranged to engage and cooperate with an outside chain link to releasably lock the pin in operative position.

CLARENCE M. FABER.

REFERENCES CITED

The following references are of record in the file of this patent:

UNITED STATES PATENTS

| Number | Name | Date |
|---|---|---|
| 382,057 | Schenck | May 1, 1888 |
| 978,330 | Norman | Dec. 13, 1910 |
| 1,595,580 | Stahl | Aug. 10, 1926 |

FOREIGN PATENTS

| Number | Country | Date |
|---|---|---|
| 24,232 | Great Britain | 1898 |